(12) United States Patent
Lowe

(10) Patent No.: US 11,821,520 B2
(45) Date of Patent: Nov. 21, 2023

(54) HIGH TEMPERATURE DRYER SEALS FOR THE REAR PORTION OF A DRYER AND RELATED METHODS

(71) Applicant: Felters of South Carolina, LLC, Roebuck, SC (US)

(72) Inventor: Vernon J. Lowe, Greenback, TN (US)

(73) Assignee: Felters of South Carolina, LLC, Roebuck, SC (US)

( * ) Notice: Subject to any disclaimer, the term of this patent is extended or adjusted under 35 U.S.C. 154(b) by 1310 days.

(21) Appl. No.: 15/919,196

(22) Filed: Mar. 12, 2018

(65) Prior Publication Data

US 2018/0274160 A1 Sep. 27, 2018

Related U.S. Application Data

(60) Provisional application No. 62/469,707, filed on Mar. 10, 2017.

(51) Int. Cl.
| | |
|---|---|
| *F16J 15/3284* | (2016.01) |
| *F16J 15/328* | (2016.01) |
| *F16J 15/3268* | (2016.01) |
| *F16J 15/06* | (2006.01) |
| *D06F 58/04* | (2006.01) |

(52) U.S. Cl.
CPC .......... *F16J 15/3284* (2013.01); *D06F 58/04* (2013.01); *F16J 15/065* (2013.01); *F16J 15/328* (2013.01); *F16J 15/3268* (2013.01)

(58) Field of Classification Search
CPC ........ D06F 58/04; F16J 15/065; F16J 15/164; F16J 15/3204; F16J 15/3268; F16J 15/328; F16J 15/3284
See application file for complete search history.

(56) References Cited

U.S. PATENT DOCUMENTS

| | | | |
|---|---|---|---|
| 2,459,720 A | 1/1949 | Poltorak | |
| 3,637,224 A * | 1/1972 | Triplett | .......... D06F 58/04 277/936 |
| 3,828,445 A * | 8/1974 | Smoot | .......... D06F 58/04 277/379 |
| 3,938,813 A * | 2/1976 | Forch | .......... F16J 15/3284 277/556 |
| 4,156,533 A | 5/1979 | Close et al. | |
| 4,214,571 A | 7/1980 | Scherer | |

(Continued)

*Primary Examiner* — Nicholas L Foster
(74) *Attorney, Agent, or Firm* — Michael Best & Friedrich LLP

(57) ABSTRACT

High temperature dryer seals and related methods are provided. A high temperature dryer seal can include a first substrate having first and second ends and first and second sides. The first substrate can include a low-melt polymer. The first end and the second end of the first substrate can secured together so that the first substrate forms at least a portion of an annular shape. The dryer seal can also include a second substrate secured to the first substrate at the second side of the first substrate. The second substrate can include a high temperature material that has a higher melting point than the low-melt polymer of the first substrate. The dryer seal also includes a heat resistant coating attached to the second substrate with the heat resistant coating being activated at a temperature that is higher than a melting point of the low-melt polymer.

20 Claims, 6 Drawing Sheets

(56) References Cited

U.S. PATENT DOCUMENTS

| | | | |
|---|---|---|---|
| 4,669,200 A * | 6/1987 | Carr | F16J 15/54 |
| | | | 277/572 |
| 5,383,316 A | 1/1995 | Burke et al. | |
| 5,407,214 A | 4/1995 | Lew et al. | |
| 5,628,520 A | 5/1997 | Ueda et al. | |
| 5,765,838 A | 6/1998 | Ueda et al. | |
| 6,076,834 A * | 6/2000 | Jornhagen | F16J 15/022 |
| | | | 277/609 |
| 6,675,496 B1 * | 1/2004 | Moon | D06F 58/04 |
| | | | 34/598 |
| 7,007,955 B2 * | 3/2006 | Cross | D06F 58/04 |
| | | | 277/654 |
| 9,562,610 B2 | 2/2017 | Lowe et al. | |
| 9,970,705 B2 | 5/2018 | Lowe | |
| 10,113,646 B2 | 10/2018 | Lowe et al. | |
| 10,215,286 B2 * | 2/2019 | Allen | F16C 33/7823 |
| 2005/0017459 A1 | 1/2005 | Cross et al. | |
| 2006/0111003 A1 | 5/2006 | Balthes | |
| 2006/0145430 A1 * | 7/2006 | Cross | D06F 58/04 |
| | | | 277/652 |
| 2006/0178064 A1 | 8/2006 | Balthes | |
| 2007/0044342 A1 | 3/2007 | Burns et al. | |
| 2007/0074419 A1 | 4/2007 | Starrett | |
| 2007/0116991 A1 | 5/2007 | Balthes | |
| 2007/0141318 A1 | 6/2007 | Balthes | |
| 2008/0090477 A1 | 4/2008 | Balthes | |
| 2013/0174435 A1 * | 7/2013 | Rockwell | D04H 1/43 |
| | | | 34/108 |
| 2013/0266787 A1 * | 10/2013 | Rockwell | D06F 58/04 |
| | | | 264/103 |
| 2013/0337205 A1 * | 12/2013 | Rockwell | D04H 1/55 |
| | | | 52/220.8 |
| 2014/0248814 A1 | 9/2014 | Handermann | |
| 2014/0327212 A1 * | 11/2014 | Lowe | F16J 15/16 |
| | | | 156/217 |
| 2015/0132564 A1 | 5/2015 | Arfsten et al. | |
| 2016/0101303 A1 * | 4/2016 | Rockwell | F26B 11/024 |
| | | | 34/603 |
| 2016/0187062 A1 * | 6/2016 | Lowe | D06F 58/04 |
| | | | 427/372.2 |
| 2016/0257044 A1 * | 9/2016 | Schramm | B60J 10/74 |
| 2017/0276250 A1 * | 9/2017 | Lowe | D06F 58/04 |
| 2017/0284546 A1 * | 10/2017 | Allen | F16J 15/3284 |
| 2018/0128373 A1 | 5/2018 | Lowe | |
| 2018/0274159 A1 | 9/2018 | Lowe | |

* cited by examiner

HIGH TEMPERATURE DRYER SEALS FOR THE REAR PORTION OF A DRYER AND RELATED METHODS

RELATED APPLICATION

The presently disclosed subject matter claims the benefit of U.S. Provisional Patent Application Ser. No. 82/489,707, filed Mar. 10, 2017, the disclosure of which is incorporated herein by reference in its entirety.

TECHNICAL FIELD

The present subject matter relates to dryer seals and related methods. In particular, the present subject matter relates to fire retardant dryer seals for use in clothes dryer appliances that can allow air within a dryer drum to escape when the seal is heated to higher than normal operation temperatures and to expand to restrict airflow at extremely high temperatures and methods related to such dryer seals.

BACKGROUND

Domestic clothes dryers are a common household appliance that, in conjunction with domestic washers, have reduced the burden of laundry on many households by reducing the amount of time devoted by household caregivers to washing and drying clothes. Such clothes dryers typically include a housing (also known as a bulkhead) and a rotating drum; or cylinder, supported within the housing. Commercially available air vented domestic clothes dryers use the rotating drum to tumble loads of washed clothes in a heated environment by generally using a blower/fan to pull ambient air across heater coils to raise the temperature of air passing into the drum. The heated air is pulled through the tumbling clothes and out through a lint semen for discharge. Commercially available condensing domestic clothes dryers also use the rotating cylinder to tumble loads of laundry in a heat environment, but treat the air in a slightly different manner. These condensing domestic clothes dryers use a blower/fan to pull ambient air across heater coils into the drum, through the tumbling clothes and out through a lint screen, across a condenser coil to remove moisture, and then return to the drum.

Both types of dryers use dryer seals to support and seal the drum usually at both ends. These dryer seals perform a multitude of functions within these domestic clothes dryers. Current seals are made with rest nonwoven materials produced with varying percentages of wool and polyester and also on occasions the addition of vinyl or some low friction material, in particular, these seals are usually in the form of rings of felt which may be disposed between the housing and the drum so as to bear against the drum as it rotates. The materials of the ring can interact to form an elastic fit or may be glued into position depending on the arrangement of components.

The seals serve as a friction surface between the rotating drum and the bulkhead sections while also maintaining a seal to hold drying heat within the drum. In particular, the use of seals is desirable to reduce the friction, or prevent the creation of excess friction, between the drum and the bulkhead and to prevent air leakage between the drum and the clothes dryer cabinet which could detrimentally affect the air flow system of the dryer.

The structure of the seals can vary depending on the type, commercial brand and design of the dryer. Many current seals have multi-layered ring structures incorporating a folded over exterior layer such as wool-blend, polyester, rayon, aramid fibers or polyester blend nonwoven material. These multi-layered ring structured seals can be folded and stitched to assume different shapes to perform their intended functions within an appropriate dryer design. In some embodiments, a spacer material such as polyester or polyester blend material can also be included that can be held within the folded over exterior. The folded materials can form legs that project outwardly from the folded edge. These legs can have a sealing contacting relationship with the rotating drum. In such seal embodiments, the spacer material can typically be held in place by two seams with a first positioning seam running between an upper edge of the spacer material and one side of the folded over exterior and a second holding seam extending at an inboard position through all three layers so as to establish a coordinated stable structure.

Despite their widespread use in U.S. homes, clothes dryers are Involved in a significant number of residential fires. According to some estimates, dryer fires produce annual U.S. property losses approaching $100 million, and lead to multiple consumer deaths and hundreds of injuries. Proper installation and effective maintenance of clothes dryers can significantly reduce the risk of appliance-related fires. But recent research has shown that product construction and design considerations are also important elements in building safer dryers.

The causes of electric dryer fires have been extensively researched over the past decade by the U.S. Consumer Product Safety Commission (CPSC), industry associations including the Association of Home Appliance Manufacturers (AHAM), individual appliance manufacturers and standards organizations including Underwriters Laboratories (UL). Some research has pointed to the accumulation of lint and the subsequent reduction of air flow as a primary cause of dryer fires. Yet, other testing has supported claims that the cause of dryer fires can be attributed to a number of factors. In particular, studies have found that factors such as a dryer load, a dryer's electrical system, and a dryer's mechanical system also played a major role in reported dryer fires.

While increased consumer education regarding risks with dryer use can help reduce the number of dryer fires, attention should be focused on the design of dryers themselves and the ability of a dryer unit to actually contain a fire should one occur, United States (U.S.) fire regulations have been defined by UL Appliance Containment #UL 2158, which requires that a fire in the appliance be contained within the appliance and not allowed to escape into the environment surrounding the appliance. For fires that initiate inside the drum of a clothes dryer, one potential point of egress is the mating area between the cylinder and the front door and/or rear bulkhead. Clothes dryer fires have a wide temperature range depending on the fuel value of the load plus any fuel value items in the unit construction such as plastic baffles, friction reducing rings, fittings or bulkhead components, etc. The temperatures have been tested to exceed about 1300° F. and cycle between low and high values. These temperatures exceed the capability of sustaining structural integrity of traditionally used wool and polyester nonwoven materials, even FR treated polyesters.

Another serious and dangerous situation that arises when a fire starts or begins to smolder within the drum is the opportunity of a smoke explosion. A smoke explosion is a condition whereby the rapid increase in pressure inside the drum/combustion chamber during a dryer fire is sufficient to overcome the door lock mechanism. The lock specification has been tested and indicated a twelve (12) foot pounds locking force. Therefore, these smoke explosions create a great release of force that can create opportunity for bodily injury to people in the vicinity of the dryer and can cause the fire to spread quickly from being contained in the dryer to area surrounding the dryer and to other parts of the house. These smoke explosions occur when a fire Is contained in the drum producing smoke and providing a spark. Tests have shown that, as fire burns, the right mixture of carbon monoxide (CO) from the white smoke, which contains residual unburn hydrocarbons and oxygen ($O_2$) can occur within drum. The fire ignites this deadly mixture once it is achieved to explosive and horrific effect. Such a condition is known as pyrolysis.

As such, a need exists for improved dryer seals that can help reduce the opportunity of smoke explosions within dryers and that can help contain fires that initiate inside of a clothes dryer.

SUMMARY

The present subject matter provides seals for use in clothes dryers and rented methods. In particular, dryer seals are provided that can facilitate containment of drum initiated fires and reduce opportunity for smoke explosions within the dryers in which they are used once an ignition or a fire occurs while still providing friction reduction and air sealing capabilities under normal operating conditions. More particularly, rear dryer seals can comprise a first substrate that forms a contact surface for contacting a bulkhead of a dryer during the spinning of the drum of a dryer and a second substrate attached to the first substrate with the second substrate attached to the drum of the dryer and having a heat resistant coating secured to the second substrate. The first substrate can comprise a low-melt polymer that has a melting point below the melting point of the second substrate and the activation point of the heat resistant coating. Methods related to the manufacture and use of the rear seals disclosed herein are also provided.

Thus, it is an object of the presently disclosed subject matter to provide dryer seals that have fire retardant and/or fire resistant properties and methods related to such dryer seals. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification. Including reference to the accompanying figures, in which:

FIG. 8 illustrates a schematic cross-sectional view of a portion of an embodiment of a dryer seal including a heat resistant or fire retardant coating according to the present subject matter;

Figure 1:
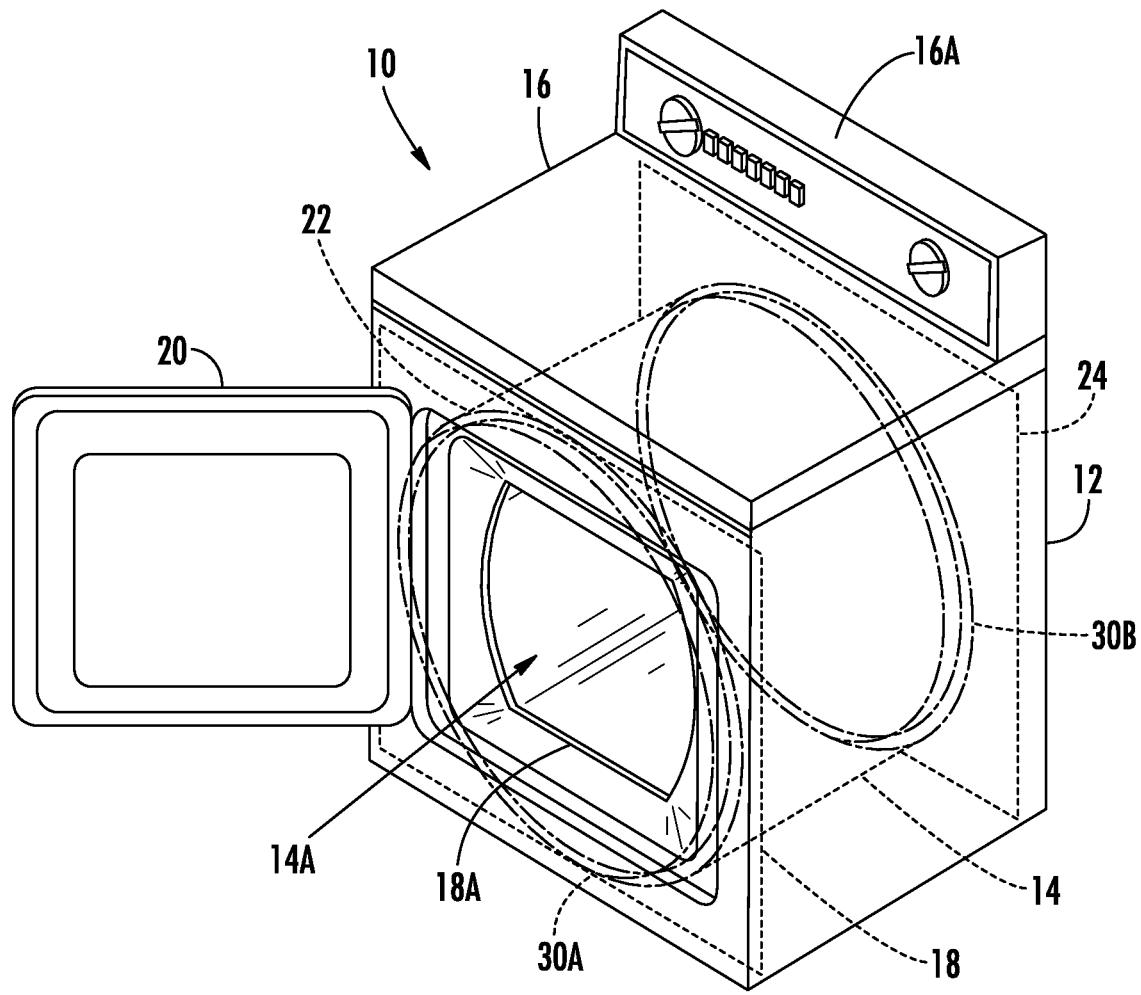
FIG. 1 illustrates a perspective view of an embodiment of a clothes dryer with a rotating drum that includes an embodiment of a seal according to the present subject matter.

Repeat use of reference characters in the present specification and drawings is intended to represent the same or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element component, region, layer or section discussed below could be termed a second feature, element, component, region, layer or section without departing from the teachings of the disclosure herein.

Similarly, when a layer or coating, is being described in the present disclosure as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Embodiments of the subject matter of the disclosure are described herein with reference to schematic illustrations of embodiments that may be idealised. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

As used herein, the prefix "nano" refers to the nanometer scale (e.g., from about 1 nm to about 999 nm). For example, particles having an average diameter on the nanometer scale (e.g., from about 1 nm to about 999 nm) are referred to as "nanoparticles". Particles having an average diameter of greater than 1,000 nm (i.e., 1 μm) are generally referred to as "microparticles", since the micrometer scale generally involves those materials having an average size of greater than 1 μm.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5 as examples.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited; the term "polymer" shall include all possible geometrical configurations of the material. These configurations include, but are not limited to isotactic, syndiotactic, and random symmetries.

As used herein, the terms "needled" and "needle-punched" in reference to nonwovens are used interchangeably.

The term "thermoplastic" is used herein to mean any material formed from a polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

Dryer seals have been shown and described in detail in U.S. Provisional Patent Application Ser. No. 61/806,944 and U.S. patent application Ser. No. 14/242,855, which are incorporated herein in their entireties. Additionally, Dryer seals have been shown and described in detail in U.S. Provisional Patent Application Ser. No. 62/044,405 and U.S. patent application Ser. No. 14/842,827, which are also incorporated herein in their entireties. The dryer seals described provide ample background and understanding of the operation of the dryer seal and description of the improvements to the dryer seals that are enhanced by the present description.

As disclosed herein, high temperature dryer seals are provided. A high temperature dryer seal can comprise a first substrate having a first end and a second end and a first side and a second side. The first substrate can comprise at least partially of a low-melt polymer. The first end and the second end of the first substrate can be secured together so that the first substrate forms at least a portion of an annular shape. Further, the first side of the first substrate can be configured to form a side of the dryer seal that forms a contact surface of the dryer seal for contacting a bulkhead of a dryer when installed on a drum in the dryer. The high temperature dryer seal can also comprise a second substrate being secured to the first substrate at the second side of the first substrate. The second substrate can be configured to form a side of the dryer seal that is attached the drum in the dryer. The second substrate can comprise a high temperature material that has a higher melting point than the low-melt polymer of the first substrate. The high temperature dryer seal can comprise a heat resistant coating attached to the second substrate, the heat resistant coating being activated at a temperature that is higher than a melting point of the low-melt polymer.

The first substrate can comprise a nonwoven fabric. For example, the first substrate can comprise a needled, or needle-punched, nonwoven fabric. In some embodiments, the first substrate can comprise a needled nonwoven fabric comprising polyethylene fibers. The first substrate and the second substrate can be secured together at the second side of the first substrate by at least one of sewing, ultrasonic welding, or heat sealing.

The first substrate can form a tonsil that is configured to extend between the drum of the dryer and the bulkhead of the dryer and a rear section of the seal that is contained to contact the bulkhead of the dryer. The first substrate can be a low temperature activation substrate that melts before heat activation of the heating resistant coating. The heat resistant coating can be configured to activate at temperatures above the melting point of the low-melt polymer to permit gases in the drum to vent until the temperature activates the heat resistant coating causing the heat resistant coating to expand to restrict air flow into the drum.

The heat resistant coating can be configured to activate at temperatures below the melting point of the high temperature material in the second substrate. The heat resistant coating can comprises particles of at least one of an inorganic mineral material or an intumescent substance dispersed within a binder as explained further below.

The second substrate can comprise a nonwoven fabric, woven fabric or a knitted fabric. The second substrate comprises a fiber with silicon therein. In some embodiments, the second substrate can comprise a silica fiber. For example, the second substrate can comprise a needled nonwoven comprising fibers comprising silicon therein, PET fibers, Flame Resistant (FR) rayon fibers, polypropylene fibers, and binder fibers. In some embodiments, the second substrate comprises a glass-reinforced plastic (GRP) material. In some embodiments, the second substrate comprises a glass-reinforced plastic ("GRP") nonwoven in some embodiments; the second substrate comprises a glass-reinforced plastic ("GRP") scrim.

The heat resistant coating can be secured to the second substrate in a variety of ways. For example, the heat resistant coating can be disposed on the second substrate. For example, one or more layers of the heat resistant coating can be sprayed or applied on the second substrate. In some embodiments, the second substrate can be folded back and secured to the first substrate on at least a portion of a surface of the first substrate that does not comprise the contact surface for the bulkhead. The heat resistant coating can also be disposed on a third substrate that is secured to the second substrate. On some embodiments, the third substrate can also be secured to the first substrate on at least a portion of a surface of the first substrate that does not comprise the contact surface for the bulkhead.

In some embodiments, the first substrate can comprise low-melt polymer fibers. In some embodiments, the first substrate can comprise a blend of low-melt polymer fibers and at least one of high-melt fibers or high-temperature burn fibers. For example, in some such embodiments, the first substrate can comprise 100% low-melt polymer fibers, such as high density polyethylene (HDPE) fibers. In some embodiments, the second substrate can comprise high-melt fibers, such silicon (Si)-containing fibers, for example, silica fibers that comprise sodium silicate.

In some embodiments, the second substrate comprises a structure to provide structural integrity and improve the seal nip without causing axial deflection of the drum. For example, the second substrate can comprise a Si-containing fibers, such as silica fibers. In some embodiments, the second substrate can comprise one or more of Si-containing fibers, PET fibers or polypropylene fibers, and/or Flame Resistant (FR) rayon fibers that are needle-punched together to form a needle-punched nonwoven. In particular, in some embodiments, the second, substrate can comprise a 12 opsy needled non-woven comprising Si-containing fibers, PET fibers, Flame Resistant (FR) rayon fibers, polypropylene fibers, and a binder. Such a substrate can have the mineral intumescent coating such that the substrate provides structural integrity and improves the seal nip without causing axial deflection of the drum.

The heat resistant coating can have an activation temperature that is higher than a melting point temperature of the low-melt polymer fibers. The heat resistant coating can comprise varies substances. For example, in some embodiments, the heat resistant coating can comprise inorganic material in a binder. The inorganic material can comprise vermiculite, mica, clay materials, and/or calcium carbonate. The particles of inorganic material can be nanoparticles or microparticles or a mixture of nanoparticles and microparticles. For example, the particles of the inorganic material can have an average thickness of less than about 50 nm, and wherein the particles have a larger dimension of about 0.5 µm to about 50 µm. The binder can comprise a film-forming binder. In some embodiments, the heat resistant coating can comprise at least one intumescent substance in a binder. In some embodiments, the heat resistant coating can comprise particles of inorganic material and at least one intumescent substance in a binder.

Thus, having a first substrate that includes low-melt polymer fibers that forms a first side and tonsil of the rear dryer seal and a second substrate secured to the first substrate that forms a second side of the rear dryer seal and to which a heat resistant coating is secured, a dryer seal that comprises a bi-textile ribbon, or bi-ribbon, can be formed. In some embodiments, the bi-textile ribbon comprises of two needle-punched non-woven felts. The bi-ribbon can have a second substrate of a high temperature Si, PET or PR, FR Rayon, Binder, 12 opsy needled non-woven section joined to a first substrate of an HDPE, binder 12 opsy needled non-woven low melt section. In some embodiments, the second substrate nonwoven can include a glass reinforced plastic ("GRP") material, such as, for example, GRP yarns, a GRP scrim, a GRP woven fabric, a GRP knitted fabric or the like. The design intent of the bi-ribben when formed into a dryer seal is to provide a heat activated vent at relatively low temperature (about 290° F.) for a low temperature activation section of the ribbon, while also providing a high temperature resistant second section of the dryer seal that will resist the combustion and melt effects and ensure if remains connected to the rotating surface of the dryer drum.

A third substrate can be provided on which the heat resistant coating can be disposed. For example, the second substrate disclosed in U.S. Provisional Patent Application Ser. No. 62/044,405 and U.S. patent application Ser. No. 14/842,827, also known as an intumescent/PET bleeder cap, can still be provided to be retained in place over the gap between the drum and rear bulkhead interface until the intumescent activation temperature (about 430° F.) is reached and completes the resealing of the drum interface, thus restricting the drum airflow to about 15 to about 30 cubic feet/minute (cfm).

The blend of the second substrate that can comprises a needled nonwoven can comprise different blends of the fibers containing high temperature Si, PET, PP, FR Rayon, and/or binder. Examples of combinations of the high temperature Si fibers, PET fibers or PP fibers, FR Rayon fibers, and binder fibers were developed that can cover a range of temperature activations and material blend combinations.

TABLE 1

FIBER BLEND COMBINATIONS FOR SOME
EMBODIMENTS OF THE SECOND SUBTRATE

| | Fiber | | | |
|---|---|---|---|---|
| | Si | PET or PP | FR Rayon | Binder (Bico) |
| Blend % | 10-50% | 35-60% | 5-15% | 10% |

The joining of the first substrate to the second substrate to form the bi-ribbon can be accomplished in different manners. For example, the first substrate and the second substrate can be combined to form the bi-ribbon by sewing, needle-punching, ultrasonic welding, heat sealing or any other method of joining polymer non-woven fibers.

During manufacture the tonsil and rear section of the seal is manufactured from the first substrate as the low temperature activation section of the seal. By having the low temperature activation section of the seal where the first substrate melt or dissipates at a low temperature, an opening of the rear of the drum to atmosphere is provided, to permit the hot enclosed gases to vent carrying with them unspent hydrocarbons and causing, the drum combustion to recommence. This new combustion can cause the drum temperature to rise and cause the heat resistant coating to activate and restrict the drum/rear bulkhead to a maximum airflow of about 30 cfm.

Once a fire starts in the drum of a dryer, the closure of the door after ignition can immediately suppress the fire due to the limited air supply and creates fuel rich incomplete combustion in the form of smoke. During testing, the measurement of gases and their distribution within the combustion chamber indicates that unspent hydrocarbon accumulation can occur either immediately above the flaming/glowing (smoldering) material (clothes) within the dryer or in the smoke accumulating in the top of the drum chamber. In these conditions, the entry of oxygen/air alters the fuel/oxygen mixture, raises the temperature and creates a chemical combustion/explosion. The oxygen source, unspent hydrocarbon content, CO content, drum component integrity and temperature and flammability of the material (clothes) within the drum of the dryer are believed to be the primary factors Influencing "smoke explosion".

In efforts to reduce/eliminate these-contributory factors, some basic gas analyses were carried out to produce some simple metrics for the presence of Oxygen, CO and hydrocarbon prior to or during a smoke explosion. These simple metrics are about 12-15% Oxygen, about 3-4% CO and about 3,000 ppm's Hydrocarbons. Using the US Department of the inferior, Bureau of Mines, Lower and Upper Explosive Limits for Flammable gases, these metrics suggest it is not a CO fueled chemical explosion as the LEL (Lower Explosive Level) for that gas is about 12.5% when, compared to the measured amount during testing of about 3-4% recorded. Ten (10) different areas of the drum were tested and, while there is a possibility for pockets of CO gas, despite sampling in three axes', no test recorded over about 4%. These findings suggest the primary fuel source is unspent hydrocarbons.

Looking at Burn Cabin factors, it is noted that the UL 2158 Containment test stipulates a 7 cfm exhaust pressure from the appliance. It has been found that the 'burn cabin' of dryers tested have an overall exhaust rate is about 375 cfm from 4 separate exhaust vents. The temperature and humidity readings of the burn cabin and significant changes in the cabin environment may influence the 'smoke explosion' event.

Testing and smoke explosion simulations that were conducted suggest there is a cooling phase in the drum that can cause a gas volume contraction, which can change in air/fuel mixture. In particular, the air/fuel mixture can become a rich mixture requiring only a small ignition source to trigger the chemical explosion. The smoke explosion temperature range is usually between about 200° F. and about 400° F. although higher temperature events have been observed. With the introduction of the intumescent front seal and a full closure of the seal carrier bulkhead feature, the overall temperature peak of UL 2158 Containment testing can be reduced. The rear of the dryer is usually where the highest temperatures occur and appears to be the source or origin of a smoke explosion. Using conventional rear dryer seal technology, the open tolerance and excessive fit/clearance of components makes control of air/oxygen entry difficult and is a contributory factor to a higher rate of smoke explosions.

The first substrate can help to reduce or eliminate the opportunity for smoke explosions from occurring in the dryers that employ these seals, because the low-melt polymer fibers melts when exposed to temperatures above a melting point to create passages for air flow through the dryer seal to allow at least a portion of any air and smoke mixture within a drum of a dryer to which the seal is installed to escape from the drum. At the same time, the second substrate attached to the drum holds the heat resistant coating in place around the drum so that once the hydrocarbons and smoke have escaped or been consumed by the fire, the heat resistant coating is activated at the higher temperatures to then restrict airflow and control the fire event in the drum.

Thus, the melted dryer seal can limit and restrict the combustion process by allowing air to flow from the drum exhausting the unspent hydrocarbons to reduce or eliminate any possible pyrolysis event. For example, the low-melt polymer fibers, once melted when exposed to temperatures above its melting point, can create passages for air flow between a rim of a drum and a bulkhead of a dryer of about 0.010 inches and about 0.012 inches around the rim of the drum with the second substrate still attached to the drum. As heat within the dryer drum increases, the heat resistant coating can be activated causing it to expand and restrict the flow of too much air into the drum to limit the ability of material, such as clothing, within the dryer that are smoldering to combust or material, such as clothing, within the dryer that may be burning to burn at a rate that allows the fire to escape the drum. In this manner, such dry seals can operate as an air throttle for the dryer drum that, depending on the circumstances, prevents air flow into and from drum, increases air flow from the drum, or restricts airflow into the drum.

The first substrate can comprise any number of types of substrates. For example, the first substrate can comprise a nonwoven fabric, woven fabric or a knitted fabric. Such fabrics can comprise a low-melt polymer. For example, in some embodiments, such fabrics can comprise a blend of a low-melt thermoplastic polymer and a high-melt thermoplastic polymer. In some embodiments, such fabrics can comprise 100% low-melt thermoplastic polymer.

In some embodiments, the first substrate comprises a needle-punched nonwoven fabric comprising between about 20% and about 80% low-melt polymer fibers and between about 80% and about 20% high-melt polymer fibers. For example, in some embodiments, the needle-punched nonwoven fabric can comprise about 20% low-melt polymer fibers and about 80% high-melt polymer fibers. In some embodiments, the needle-punched nonwoven fabric can comprise about 50% low-melt polymer fibers and about 50% high-melt polymer fibers. In some embodiments, the needle-punched nonwoven fabric can comprise about 80% low-melt polymer fibers and about 20% high-melt polymer fibers. In some embodiments, the needle-punched nonwoven fabric can comprise about 160% low-melt polymer fibers.

In some of these embodiments, the first substrate can comprise a needle-punched nonwoven fabric comprising a blend of low-melt high density polyethylene (HDPE) fibers and polyester fibers. For example, the first substrate can comprise a needle-punched nonwoven fabric comprising a blend of high density polyethylene (HDPE) fibers having a melting point of about 270° F. and polyester fibers having a melting point above about 400° F.

In some of these embodiments, the first substrate comprises a needle-punched nonwoven fabric comprising a blend of low-melt high density polyethylene (HDPE) fibers and high-melt polypropylene fibers.

In some embodiments, the first substrate can comprise a needle-punched nonwoven fabric that can comprise 100% HDPE fiber content. For example, the first substrate can comprise a needle-punched nonwoven fabric comprising a blend of high density polyethylene (HDPE) fibers having a melting point of about 270° F.

Depending on the types of low-melt polymer fibers used, the melting points can vary. In some embodiments, the low-melt polymer fibers can melt between about 265° F. and about 300° F. In some embodiments, the low-melt polymer fibers can melt between about 280° F. and about 295° F. In some embodiments, the low-melt polymer fibers can melt between about 285° F. and about 295° F.

Figure 2:
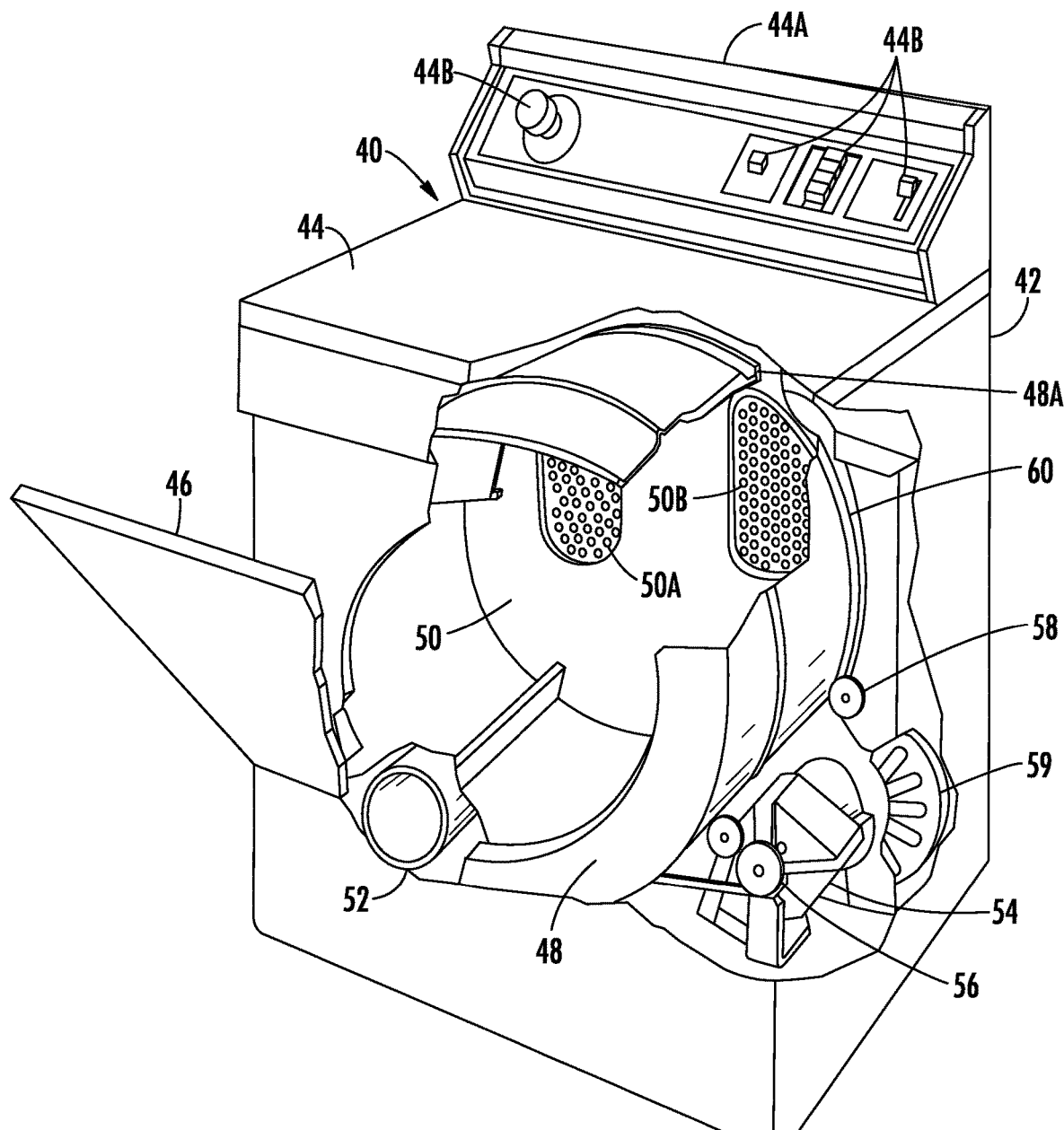
FIG. 2 illustrates a perspective view of another embodiment of a clothes dryer with a rotating drum that uses an embodiment of a seal according to the present subject matter.

Referring now to FIGS. 1 and 2, example embodiments of a domestic clothes dryer are provided that illustrate the general placement and location of dryer seals according to the present disclosure in relation to other components of the respective dryers. In FIG. 1, an embodiment of a dryer 10 comprising a cabinet body 12 housing a heated rotating drum 14 is provided. As illustrated, cabinet body 12 can comprise a top panel 18 with a control console 16A. The cabinet body 12 can also comprise a front bulkhead 18 (shown in dotted lines) that can include a door opening 18A for loading clothing articles into a mouth 14A of the drum 14. The door opening 18A may be closed by means of a door 20. The front bulkhead 18 of the cabinet body 12 typically can include a front bulkhead flange 22 (shown schematically as the outer front circular dotted line) surrounding the door opening 18A and projecting into the inferior of the cabinet body. In such an embodiment, the front bulkhead flange 22 can be disposed generally around a reduced diameter drum opening. Similarly, cabinet body 12 can comprise a rear bulkhead 24 (shown in dotted lines) that can have a rear bulkhead flange (not shown in FIG. 1) projecting into the interior of the cabinet body and can also be disposed generally around a reduced diameter drum opening.

As shown in FIG. 1, a front seal 30A according to the disclosure herein (shown in dotted circular lines and generally interior to the bulkhead flange 22) can be disposed between the front bulkhead flange 21 of the front bulkhead 18 and a front edge outer wall portion of the drum 14. Similarly, a rear seal 30B according to the disclosure herein (shown in dotted circular lines) can be disposed between the rear bulkhead flange of the rear bulkhead 24 and a rear edge outer wall portion of the drum 14. Since dryers are typically vacuum systems, the seals 30A, 30B in operation can prevent or at least reduce the draw of cool (non-heated) air from around the drum 14. With this flow path blocked, air is drawn more efficiently into the drum 14 from a heated element area for use and eventual vent discharge. Additionally, the seals 30A, 30B can comprise a structure that includes contact surfaces that can provide a reduced factional engagement between the bulkheads 18, 24 and the drum 14. Further, one or both of the seals 30A, 30B can comprise a structure that provides both a method to reduce or eliminate smoke explosions within the dryer and fire retardant properties to aid in containment if a fire was to ignite in the drum 14. For example, the seals 30A, 30B can comprise body structures that can include contact surfaces that create a seal when the dryer is operating within normal temperature ranges but allows air flow egress from the dryer at high temperatures above the upper operational temperatures. Further, the seals 30A, 30B can comprise a coating over at less a portion of the respective seal 30A, 30B that provides or enhances the respective seal's fire retardant and/or fire resistant properties. Both of these properties are explained in more detail below.

Referring to FIG. 2, a partial cross-sectional view of a different embodiment of a clothes dryer 40 is provided that better illustrates an example interior of a clothes dryer. FIG. 2 refers to one type of air flow configuration, an in and out in the rear bulkhead. This is not meant to exclude other air flow paths such as an axial flow where air is either forced or vacuum fed across the heater coils or gas burner, and travels axially to the front panel/bulkhead and exits the drum through the screen and fan. It should be understood that the dryer seal technologies disclosed herein can be used in a variety of different dryer configurations.

Dryer 40 can comprise a cabinet body 42 with a top panel 44 having a control console 44A along a rear portion thereof incorporating a plurality of controls 44B for selecting an automatic series of drying steps. The cabinet body 42 can have a front door 48 providing access to the interior of a horizontally rotatable drying drum 48. The cabinet body 42 can also have a non-rotating rear bulkhead 50 with air inlets 50A and air outlets 50B therein for charging the interior of the drum 48 with heated air from a heater 52 and for exhausting moisture laden air. In this embodiment of a dryer, an electric motor 54 can be provided to rotate the drum 50 through a pulley arrangement 56 on a plurality of rollers 58. The motor 54 can also drive a fan 59 which provides the air flow through the interior of the drum 48. The rotating drum 48 and the stationary rear bulkhead 50 can have a rear seal 60 extending therebetween. The rear seal 60 can be affixed to a rim 48A of the rotatable drum 48 and can be in frictional engagement with the rotating drum 48 and the stationary rear bulkhead 50. Cabinet body 42 can also comprise a stationary front bulkhead (not shown) with a front seal (not shown) disposed between the front bulkhead and a front rim of the drum 48.

In operation, the rear seal and the front seal (not shown) used in dryer 40 can prevent or at least reduce the draw of ambient air from around the drum 48. Instead, air is drawn more efficiently through heater 52 and into the drum 48 through air inlets 50A before being eventually discharged through outlets 50B. As above, the rear seal 60 and the front seal can comprise a structure that includes contact surfaces that can provide a reduced frictional engagement between the rear bulkhead 50 and the drum 48 and between the front bulkhead and the drum 48. Further, the rear seal 60 and the front seal can comprise a structure that provides both a method to reduce or eliminate smoke explosions within the dryer and fire retardant properties to aid in containment if a fire was to ignite in the drum 48. For example, the rear seal 60 and the front seal can comprise body structures that create a seal when the dryer is operating within normal temperature ranges but allow air flow egress from the dryer at high temperatures above the upper operational temperatures. Further, the rear seal 60 and the front seal can comprise a coating over at least a portion of the respective seal that provides or enhances tire retardant properties of the respective seal as explained in more detail below.

The structure and shape of the seals: can be dependent upon the design of the interior of the respective dryer in which the seals are to be used and particularly dependent, upon the designed engagement between the respective bulkheads and the drum used within the dryer. In particular, the drum size, drum opening and rim configuration, the bulkhead shape and configuration can impact the determination of the construction, structure, and shape of the respective seals as well as the materials used therein. Depending on the design of the respective dryer, the seal for use between the rear rim of the drum and the rear bulkhead can comprise different structure. For example, the seals can be T-shaped cross-sectional seals as described further below in more detail.

Figure 3A:
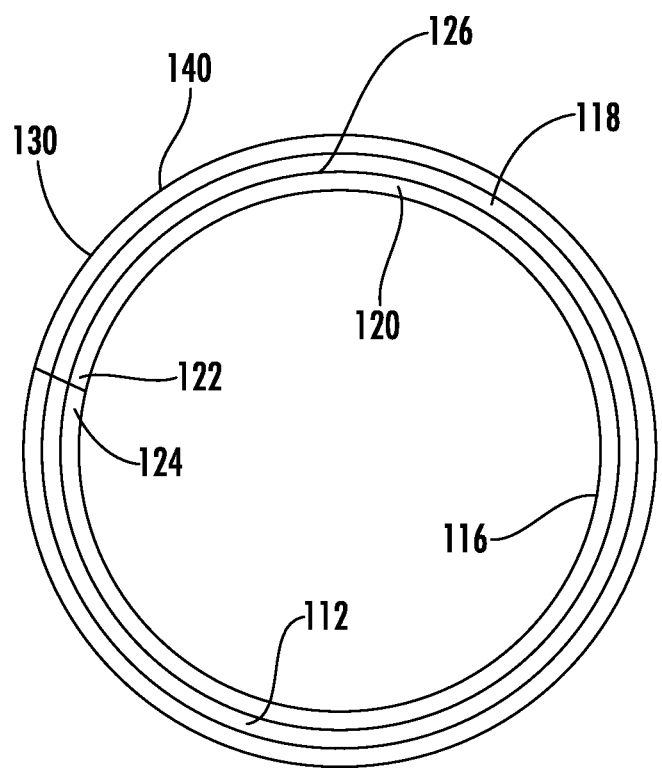
FIGS. 3A and 3B illustrate a respective schematic front plan view and side plan view of an example embodiment of a rear seal for a dryer according to the present subject matter.
Figure 3B:
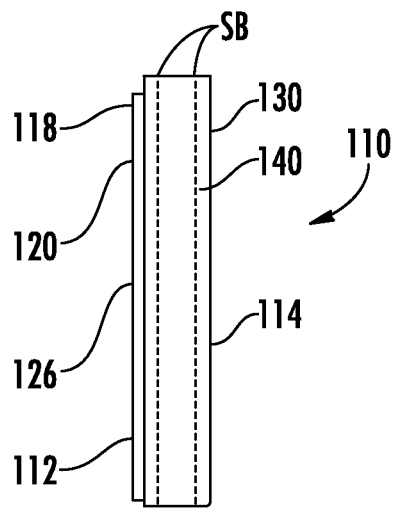

Referring to FIGS. 3A and 3B, an embodiment of an annular high temperature rear dryer seal, generally 110, is provide that: can comprise a first substrate 120 and a second substrate 130 that are secured together as a bi-textile ribbon. The first substrate 120 has a first end 122 and a second end 124 as well as a first side 128 and a second side 128. The first substrate 120 can comprise at least partially of a low-melt polymer. The first end 122 and the second end 124 of the first substrate 120 can be secured together so that the first substrate 120 forms at least a portion of an annular shape as shown in FIGS. 3A and 3B. In some embodiments, the ends of the second substrate 130 can also be secured together. Further, the first side 120 of the first substrate 120 can be configured to form a side 112 of the dryer seal 110 that forms a contact surface of the dryer seal 110 for contacting a bulkhead of a dryer when Installed on a drum in the dryer and a tonsil 116 that can extend between the dryer drum and the bulkhead when the seal is installed. The first substrate 120 can comprise a rear section 118 of the seal 110 that Is configured to contact the bulkhead of the dryer.

The second substrate 130 can be secured to the first substrate 120 at the second side 128 of the first substrate 120. The second substrate 130 can be configured to form a side 114 of the dryer seal that is attached the drum in the dryer. For example, the side 114 of the dryer seal 110 formed by the second substrate 130 can be secured to the drum of the dryer by an adhesive. The second substrate 130 can comprise a high temperature material that has a higher melting point than the low-melt polymer of the first substrate 120. The high temperature dryer seal 110 can comprise a heat resistant coating 140 attached to the second substrate 130. The heat resistant coating 140 can be activated at a temperature that is higher than a melting point of the low-melt polymer.

The first substrate 120 can comprise a nonwoven fabric. For example, the first substrate 120 can comprise a needled nonwoven fabric. In some embodiments, the first substrate 120 can comprise a needled nonwoven fabric comprising polyethylene fibers. The first substrate 120 and the second substrate 130 can be secured together at the second side 128 of the first substrate by at least one of sewing, needle-punching, ultrasonic welding, or heat sealing. For example, second substrate 130 is secured to first substrate 120 by stitch-bonding SB as shown in FIG. 3B.

The second substrate 130 can comprise a nonwoven fabric, woven fabric or a knitted fabric. The second substrate 130 comprises a fiber with silicon therein, in some embodiments, the second substrate 130 can comprise a silica fiber. For example, the second substrate 130 can comprise a needled nonwoven comprising fibers comprising silicon therein, PET fibers, Flame Resistant (FR) rayon fibers, and binder fibers, in some embodiments, the second substrate 130 comprises a glass-reinforced plastic ("GRP") material. In some embodiments, the second substrate 130 comprises a glass-reinforced plastic ("GRP") nonwoven. In some embodiments, the second substrate 130 comprises a glass-reinforced plastic ("GRP") scrim.

Figure 4:
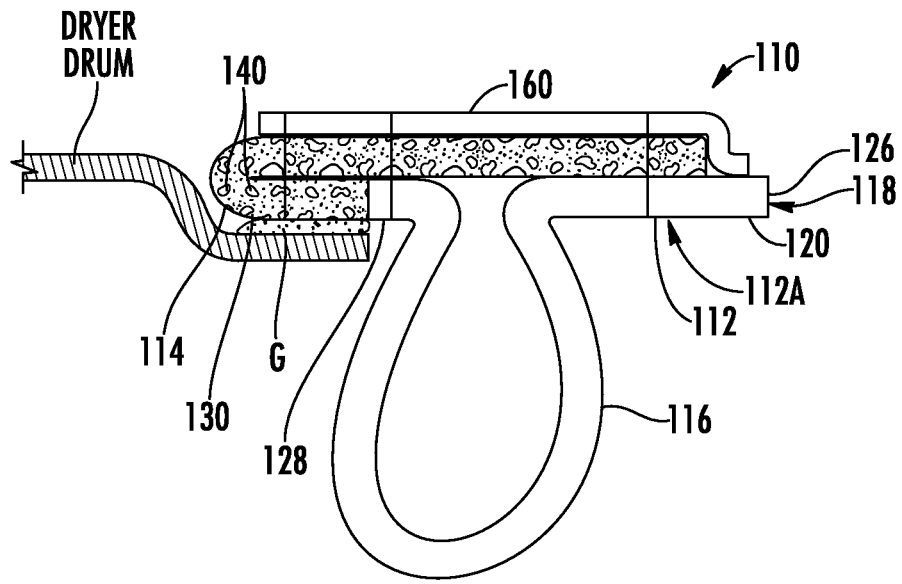
FIG. 4 illustrates a schematic cross-sectional view of an embodiment of a dryer seal with a high temperature, fire retardant coating on a portion thereof according to the present subject matter.

As shown in FIG. 4, another embodiment of an annular high temperature rear dryer seal, generally 110, is provide that can comprise a first substrate 120 and a second substrate 130 that are secured together as a bi-textile ribbon. The first substrate 120 can at least partially comprise a low-melt polymer. The second substrate 130 can comprise a high temperature material that has a higher melting point than the low-melt polymer of the first substrate 120. The high temperature dryer seal 110 can also comprise a heat resistant coating 140 attached to the second substrate 130. The heat resistant coating 140 is activated at a temperature that is higher than a melting point of the low-melt polymer. The first substrate 120 can have a first side 126 and a second side 128. The second substrate 130 can be secured to the first substrate 120 at the second side 128 of the first substrate 120. The first side 126 of the first substrate 120 can be configured to form a side 112 of the dryer seal 110 that forms a contact surface 112A of the dryer seal 110 for contacting a bulkhead of a dryer when installed on a drum in the dryer. The first substrate 120 and the second substrate 130 can be secured together at the second side 128 of the first substrate 120 by at least one of sewing, needle-punching, ultrasonic welding, or heat sealing.

The first substrate 120 can form a tonsil 116 of the dryer seal 110 that Is configured to extend between the drum of the dryer and the bulkhead of the dryer and a rear section 118 of the seal 110 that is configured to contact the bulkhead of the dryer. With the first substrate comprising a low melt polymer, the first substrate 120 can be a low temperature activation substrate that melts before heat activation of the heating resistant coating 140. The heat resistant coating 140 can be configured to activate at temperatures above the melting point of the low-melt polymer to permit gases in the drum to vent until the temperature activates the heat resistant coating 140 causing the heat resistant coating to expand to restrict air flow into the drum. At the same time, the heat resistant coating 140 can be configured to activate at temperatures below the melting point of the high temperature material in the second substrate 130. As above, a side 114 of the dryer seal 110 formed by the second substrate 130 can be secured to the drum of the dryer by an adhesive, such as a glue G. In this manner, the heat resistant coating 140 that is secured to the second substrate 130 can be held in place by the second substrate 130 that is attached to the drum of the dryer as the first substrate 120 contacts the bulkhead of the dryer. The heat resistant coating 140 can comprises particles of at least one of an inorganic mineral material or an intumescent substance dispersed within a binder as explained further below.

The dryer seal 110 shown in FIG. 4 can also comprise a third substrate 160 that is secured to the second substrate 130. In some embodiments, the third substrate 160 can also be secured to the first substrate 120 on at least a portion of a surface of the first substrate 120 that does not comprise the contact surface 112A for the bulkhead. In the embodiment shown in FIG. 4, the second substrate 130 is folded back over top of the first substrate with the third substrate 160 extending above the folded portion of the second substrate 130. In some embodiments as shown in FIG. 4, the portion of the second substrate 130 that is folded over top of the first substrate 120 can be secured to the first substrate 120 on the portion that forms the rear side of the dryer seal 110. The third substrate 160 can comprise an intumescent/PET bleeder cap that can protect the heat resistant coating 140. For example, the third substrate 160 can comprise a polyester nonwoven substrate or a polyester extruded substrate. The third substrate 160 can comprise a structure to provide structural integrity and improve the seal nip without causing axial deflection of the drum. The third substrate 150 can be sewn, stitchbonded, heat bonded, ultrasonic welded, RF welded, or the like to the second substrate 130, and in some cases, the first substrate 120.

As with the embodiment shown in FIGS. 3A and 3B, the second substrate 130 can comprise a nonwoven fabric, woven fabric or a knitted fabric. The second substrate 130 comprises a fiber with silicon therein. In some embodiments, the second substrate 130 can comprise a silica fiber. For example, the second substrate 130 can comprise a needled nonwoven comprising fibers comprising silicon therein, PET fibers or polypropylene fibers, Flame Resistant (FR) rayon fibers, and binder fibers. In some embodiments, the second substrate 130 comprises a glass-reinforced plastic ("GRP") material in some embodiments, the second substrate 130 comprises a glass-reinforced plastic ("GRP") nonwoven. In some embodiments, the second substrate 130 comprises a glass-reinforced plastic ("GRP") scrim.

The heat resistant coating 140 can be secured to the second substrate 130 in a variety of ways. For example, as shown in FIG. 4, the heat resistant coating 140 can be disposed on the second substrate 130. For example, one or more layers of the heat resistant coating can be sprayed or applied on the second substrate 130. For instance, the second substrate 130 can be coated with an intumescent substance dispersed within a binder or coated with an inorganic mineral material dispersed within a binder. In some embodiments, the second substrate 130 can be folded back and secured to the first substrate 120 on at least a portion of a surface of the first substrate 120 that does not comprise the contact surface 112A for the bulkhead.

Figure 5:
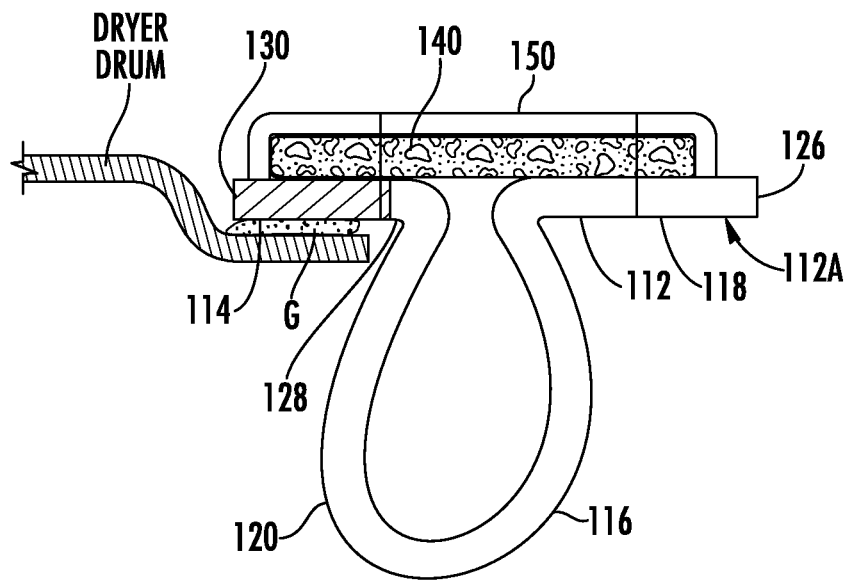
FIG. 5 illustrates a schematic cross-sectional view of another embodiment of a dryer seal with an embodiment of a high temperature, fire retardant coating according to the present subject matter.

As shown in FIG. 5, another embodiment of an annular high temperature rear dryer seal, generally 110, is provide that can comprise a first substrate 120 and a second substrate 130 that are secured together as a bi-textile ribbon, but with a heat resistant coating 140 that can be disposed on a third substrate 150 that is secured to the second substrate 130. In the embodiment shown in FIG. 5, the first substrate 120 and second substrate 130 can be secured to together on a second side 128 of the first substrate 120 and the second substrate 130 can form a second side of the dryer seal 110 that can be secured to a drum of a dryer with an adhesive G, for example, while the first end of the first substrate 126 can form a first side 112 of the dryer seal that has a contact surface 112A for contacting a bulkhead of the dryer and form a rear section 118 of the dryer seal 110. The second substrate 130 is secured to the third substrate 150 that has the heat resistant coating 140 and, therefore, does not need extend over the portion of the first substrate 120 that extends over the gap between the dryer drum and the bulkhead and forms a tonsil 118 that is configured to extend between the drum and bulkhead. The heat resistant coating 140 is extended over this portion of the first substrate 120 with the third substrate 150.

In some embodiments, the third substrate 150 can also be secured to the first substrate 120 on at least a portion of a surface of the first substrate 120 that does not comprise the contact surface 112A for the bulkhead. The third substrate 150 can comprise an intumescent/PET bleeder cap. For example, the third substrate 150 can comprise a polyester nonwoven substrate or a polyester extruded substrate. The third substrate 150 can comprise a structure to provide structural integrity and improve the seal nip without causing axial deflection of the drum. The third substrate 150 can be sewn, stitchbonded, heat bonded, ultrasonic welded, RF welded, or the like to the second substrate 130, and in some cases, the first substrate 120.

As above, the second substrate 130 can comprise a nonwoven fabric, woven fabric or a knitted fabric. The second substrate 130 comprises a fiber with silicon therein. In some embodiments, the second substrate 130 can comprise a silica fiber. For example, the second substrate 130 can comprise a needled nonwoven comprising fibers comprising silicon therein, PET fibers or polypropylene fibers. Flame Resistant (FR) rayon fibers, and binder fibers, in some embodiments, the second substrate 130 comprises a glass-reinforced plastic ("GRP") material. In some embodiments, the second substrate 130 comprises a glass-reinforced plastic ("GRP") nonwoven. In some embodiments, the second substrate 130 comprises a glass-reinforced plastic ("GRP") scrim.

The coated fabrics can then be included in a seal to fit the specific drum and bulkhead interface criteria. The seal and/or the fabrics that are coated can comprise low-melt polymer fibers, a blend of low-melt polymer fibers and other fibers, a blend of low-melt polymer fibers and high-melt polymer fibers that will facilitate the elimination of possibility of smoke explosions within the dryer. The seal formation can be accomplished in many ways including sewing, heat bonding, ultrasonic welding, RF welding, etc.

As stated above and explained in more detail below, the coating can include an intumescent substance and/or a mineral based material. The mineral based material can include but is not limited to vermiculite, mica, clay materials, calcium carbonate and the like or a mixture thereof. Vermiculite is generally known as a hydrated laminar magnesium-aluminum-iron silicate. Due to its crystalline structure, vermiculite expands with the application of heat. The expansion known as exfoliation is the result of the mechanical separation of layers of the vermiculite by the rapid conversion of the contained water into steam. The exfoliated material can then be combined with some form of chemical binder material which can in some instances include, but is not limited to a latex or silicon material. The binder can also comprise intumescent technology whereby the coating will swell and form a multi layered char form when exposed to heat. High carbon char is extremely heat resistant and is widely used in rocket and jet pipe technology. In some embodiments, the binders that comprise one or more intumescent substances can be used with or without a mineral based material. The mineral based material and/or the intumescent substances can, in some embodiments, include nanoparticles and/or microparticles.

Figure 6:
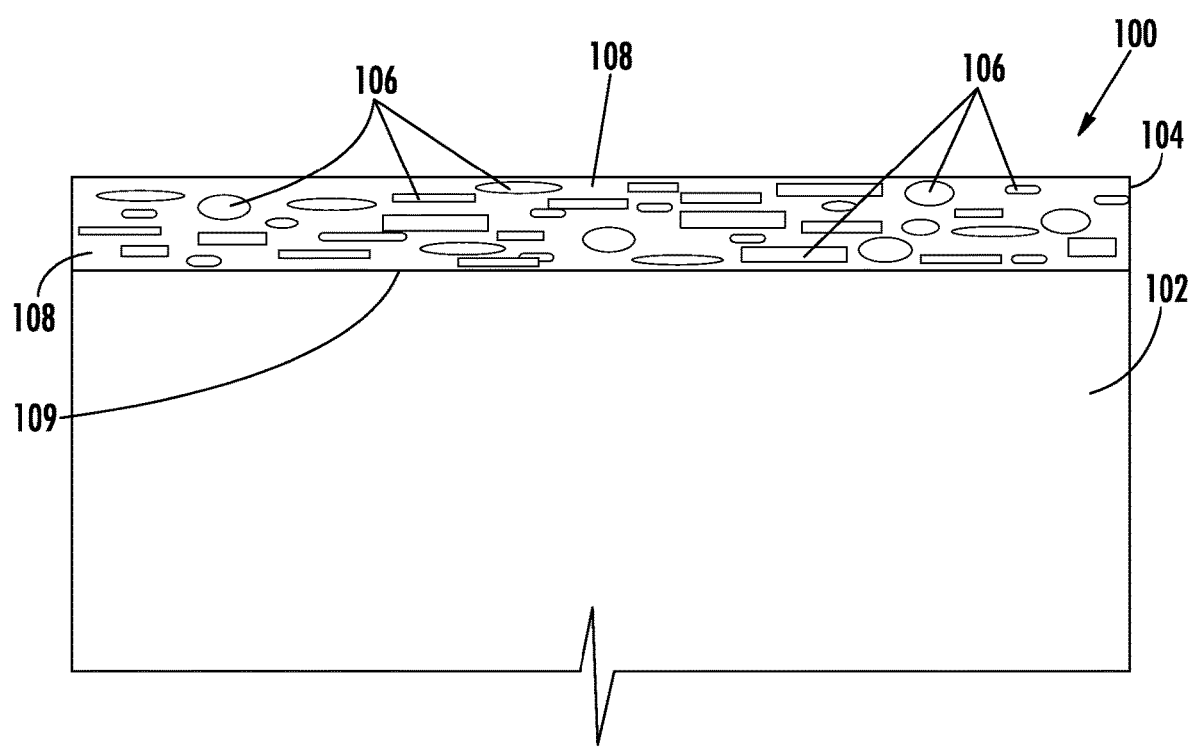

As shown in FIG. 6, a portion of a fire retardant dryer seal, generally designated 100, that schematically illustrates a heat resistant coating 104 thereon. Dryer seal 100 can comprise a substrate 102, which can be the second substrate of the bi-textile ribbon or a third substrate for carrying the heat resistant coating that can comprise one or more layers of textile material. The substrate 102 can include, but is not limited to nonwoven material, woven material, knitted material, film material or combinations thereof. For example, the substrate 102 can comprise a nonwoven fabric that can be needled, stitchbonded and/or heat bonded for example through point bonding. Alternatively, the substrate can be bonded through ultrasonic welding, RF welding, or like. The substrate 102 can comprise high-melt fibers or high-temperature burn fibers.

The dryer seal 100 can have the heat resistant coating 104 disposed on the substrate 102, which can be the second substrate of the bi-textile ribbon or a third substrate for carrying the heat resistant coating. In the embodiment shown, the heat resistant coating 104 can generally include particles 108 dispersed within a film-forming binder 108. In some embodiments (not shown), a heat resistant coating 104 can comprise an intumescent substance without the inclusion of particles 106.

In some embodiments, the particles 108 can comprise an inorganic mineral. The inorganic mineral particles 106 can generally serve, collectively, to deflect and/or absorb heat energy applied to the coating. If a more significant fire event occurs in the drum, then the heat resistant coating 104 is activated to insulate and restrict air flow to the fire within the drum from between the dryer rim and the bulkheads. In this manner, the heat resistant coating is activated such that it operates as an expansion material that expands around or in proximity to the drum rim and bulkhead interface to reduce or restrict airflow into the drum to reduce the feeding of any fire therein to help contain such a fire. The inorganic material can be a higher heat capacity that can absorb the heat from an intense fire in and around the drum and insulate and deflect the heat so that the temperature on the other side of the coating 104 from the side exposed to the fire or extreme heat; is much lower. As stated above, the inorganic mineral material forming the particles 106 can include, but is not limited to, vermiculite, mica, clay materials, calcium carbonate and the like, or a mixture thereof.

In one particular embodiment, vermiculite can be included (either alone or in combination with another inorganic mineral material) in the heat resistant coating 104. As stated above, vermiculite can expand with the application of heat with the expansion, resulting from the mechanical separation of the layers within the vermiculite by the rapid conversion of contained water to steam. Without wishing to be bound by any particular theory, it is believed that this expansion mechanism serves to absorb a large portion of the heat applied to the coating, resulting in the underlying fabric or the environment on the opposite side of the expanded coating from the fire or extreme heat being sufficiently protected from that heat. Thus, the expanded material is particularly suitable for enduring the quick exposure to heat, for example, from a flash fire within a dryer, to protect the environment on the opposite side of the expanded coating from the fire and its heat.

Prior to preparing the heat resistant coating, the inorganic mineral material (e.g., vermiculite) can be chemically exfoliated and/or granulated to form delaminated platelets. Any method of granulation can be used to obtain the desired size. As particles, the inorganic material can be dispersed within a suitable solvent system. The solvent system generally includes at least one solvent that is configured to disperse the inorganic particles in a substantially homogeneous manner (particularly upon mixing) so that a substantially uniform coating can be formed therefrom. In one embodiment, the solvent system can include water, an alcohol (e.g., methanol, ethanol, propanol, etc.), an organic solvent, or mixtures thereof.

In one particular embodiment, the inorganic particles 106 may, generally, have a plate-like shape in that each particle's thickness is less than the width and/or length. This particular shape of the particles 108 can be formed via granulation and/or exfoliation as discussed above. For instance, each particle 106 can have a thickness that is at least about 10 times less than the largest dimension of the particle. For example, the particles 106 can have an aspect ratio (width/length; thickness) of between about 500:1 to about 1000:1.

For example, the particles 108 may have an average thickness of less than about 50 nm, such as about 0.1 nm to about 50 nm when exfoliated. Alternatively, the particles 108 may have a larger dimension of about 0.5 µm to about 50 µm. For instance, the particles 106 may have a diameter or a greater dimension (in length or width) in the range of from about 10 µm to about 40 µm. As such, in certain embodiments, the particles 106 may have an average thickness of about 0.5 nm to about 10 nm, and may have a larger dimension of about 10 µm to about 40 µm (e.g., width and/or length). In one particular embodiment the particles 106 can have an average size of about 1 nm to about 2 nm in its thickness while having an average diameter or larger dimension in width or length of about 20 µm to about 40 µm.

Such a relatively small particle size can allow for a relatively large surface area of the mineral material for absorbing and/or dispersing heat applied thereto. Additionally, the use of such relatively small particles allows the coating to remain flexible.

The film-forming binder 108 generally serves to adhere and hold the particles 106 in place within the heat resistant coating 104 on the substrate 102. Thermal set or thermoplastic binders can be utilized to facilitate the coating process. Such binder materials include, but are not limited to, acrylic resins, styrene-butadiene rubber (SBR), polyvinyl alcohol, ethyl vinyl acetate resins, phenolic resins, etc., and combinations thereof. Additionally, other types of substances can be included in the binder 108.

A binder 108 can adhere to a portion of the dryer seal 100 to provide heat resistance, fire retardancy, and/or fire resistance to the dryer seal 100 while the dryer seal 100 still provides friction reduction and/or sealing capabilities. Regarding its fire resistance capabilities, the binder 108 can be formulated to include certain desired properties. Such properties, for example, can include, but are not limited to, having a low flame spread; having low smoke toxicity; providing thermal insulation protection; providing long term protection from heat and flame; having a low smoke production; easy application; good wear resistance; adherence to the desired substrate; and the appropriate flexibility after application to permit the dryer seal to perform its intended functions.

In some embodiments, binder 108 can comprise an intumescent coating which can fulfill many of these properties. An intumescent is a substance that swells as a result of heat exposure, thus increasing in volume and decreasing in density. The term intumescent when applied to fire protective coatings refers to a technology wherein the coating will swell and form a multi-layered char foam when exposed to heat. High carbon containing chars are extremely heat resistant and can be employed in critical high temperature applications such as the carbon on carbon composites that are machined to produce rocket exhaust nozzles. The production of these carbon on carbon composites involves the combination of graphite fibers with high char yield epoxies. After curing, these parts are graphitized in a high-pressure autoclave at high temperatures. Intumescent materials can be thermally stable to above about 1,000° C. (about 1,832° F.). With the right choice of materials, intumescent coatings can produce a low thermally conductive char foam. Thus, a coating 104 that includes an intumescent substance can form a char foam that has a low thermal conductivity when exposure to fire and/or extreme heat.

Soft char intumescent substances can produce a light char that is a poor conductor of heat, thus retarding heat transfer. Typically, these intumescent substances can also contain a significant amount of hydrates. As the hydrates are spent, wafer vapor is released, which has a cooling effect. Once the water is spent, the insulation characteristics of the char that remains can slow down heat transfer from the exposed side to the unexposed side of a coating 104. Typically, the expansion pressure that is created for these products is very low, because the soft carbonaceous char has little substance, which is beneficial if the aim is to produce a layer of insulation. Harder char intumescent substances can be produced with sodium silicates and graphite. These intumescent substances can produce a more substantial char capable of exerting quantifiable expansion pressure. For example, in some embodiments, such intumescent substances can be used as at least a portion of the binder 108 and the inorganic particles can comprise a vermiculite material as discussed above in the dryer seal 100.

While not being bound by any particular theory, if is contemplated that if a fire was to ignite in a drum, the heat resistant coating 104 of the dryer seat 100 could expand to effectively restrict the air flow into drum of the clothes dryer between the drum rim and the bulkheads. For example, in some embodiments, the air flow can be restricted to between about 15 cubic feet per minute (cfm) to about 30 cfm. This expansion can have the effect of starving any fire or potential flame so that the combustible material within the drum only smolders and does not ignite into flame and/or stay ignited. Further, the fire can be prevented from propagating through the dryer seal. This effect combined with the insulative qualities of both such a binder 108 and inorganic particles 106 in heat resistant coating 104 can increase the effectiveness of the ability of the dryer seal to facilitate containment of dryer fires within the cabinet body.

For example, the intumescent substances that can be included within the binder 108 when activated by heat to expand, i.e., char, can have a restricted air permeability of between about 15 and about 30 cfm which permits fire inside the drum to be contained, smoldering and slowly consuming the combustible material but not permitting sufficient oxygen to enter the drum and create a more violent and high temperature fire. Tests have been conducted within a drum of clothes dryers and/or apparatuses that simulate the interior chamber of a drum of a clothes dryer that indicate that a combustion event will not exceed a maximum temperature of about 800° F. when an intumescent material within a binder 108 on a dryer seal is activated. Without the intumescent, the temperatures within the drum of clothes dryers and/or apparatuses that simulate the interior chamber of a drum of a clothes dryer can reach and exceed about 1,250° F.

In particular for some embodiments of the heat resistant coatings 104 in which the binders 108 comprise an embodiment of one or more intumescent substances, the chemistry of char formation can provide a classic dehydration reaction between hydroxyls, carboxylic acids and amines or amine groups to form polymeric linkages. The dehydration reaction requires heat and can be enhanced by an acid catalyst, Water and ammonia can be liberated during these reactions. Some such substances can contain oxygen or nitrogen on every carbon and have a natural propensity for char formation. Examples can include starches and sugars. Intumescent substances can comprise amino phosphates or amino sulfonates that, upon heating, can liberate phosphoric or sulfonic acid to catalyze the dehydration reaction and ammonium ions to facilitate char formation. In some embodiments, polymeric substances without an aliphatic carbon chain can be used as at least a portion of such binders 108. Intumescent materials that have more nitrogen and oxygen on the hydrocarbon chains can be more desirable.

Commercial examples of an intumescent substance that are available include INTUMAX manufactured by Broadview Technologies, Inc. located in Newark, New Jersey. Such intumescent agents can allow the use of less intumescent agent in a binder's formulation, which, in turn, can improve the physical and adhesive properties of the coatings. Many others sources of intumescent substances that can be added to binder materials are available.

To formulate intumescent coatings several additional chemistry considerations can be considered. For example, higher amounts of oxygen and nitrogen on carbon can make it easier to produce a char. In addition, the more double bonds the less heat will be released during the initial burning stage. Also, the temperatures at which dehydration and de-hydrogenation reactions occur vary for different polymers. The choice of an intumescent substance can affect the release of acid catalyst, oxygen addition catalyst and recombinant ammonium ions. In some embodiments, the intumescent substance used can release acid catalyst, oxygen addition catalyst and recombinant ammonium ions close in time to or simultaneously with the dehydrogenation and dehydration reactions.

Other considerations involve the melt flow rheology, the char height and char strength. There are also the conventional formulation considerations having to do with everything from thixotropic behavior to flexibility and everything in between. The formulation of the binder 108 that include one or more intumescent substances can be such that the formulation can help char properties not hurt them. For example, since char layers remain on the surface, wetting agents and defoamers that reduce surface tension may want to be avoided. Certain fillers can have synergistic benefits. The particles 106 can comprise ceramic and phenolic micro spheres that can add to the thermal insulative properties. Intumescent substances can be added to binder materials such as, but not limited to, acrylic resins, styrene-butadiene rubber (SBR), polyvinyl alcohol, ethyl vinyl acetate resins, phenolic resins, etc., and combinations thereof.

These binder materials can be modified as desired to crosslink (e.g., with a crosslinking agent, such as melamine formaldehyde) or to change other characteristics such as hydrophobicity, hydrophilicity, viscosity, pH, etc. As such, other materials and components can be included within the heat resistant coating 104. For example, waxes, plasticizers, rheology modifiers, antioxidants, antistats, antiblocking agents, and other additives may be included as desired. Surfactants may be added to help disperse some of the ingredients, especially the film-forming binder within the solvent system. When present, a surfactant(s) can be included in the heat resistant coating. Exemplary surfactants can include nonionic surfactants and/or ionic surfactants.

A plasticizer may also be included in the heat resistant coating 104. A plasticizer is an additive that generally increases the flexibility of the final coating by lowering the glass transition temperature for the binder (and thus making it softer). In one embodiment, the plasticizer can be present in the heat resistant coating 104 up to about 25%, such as from about 5% to about 20%, by weight. Likewise, viscosity modifiers can be present in the heat resistant coating. Viscosity modifiers are useful to control the rheology of the coatings in their application. A particularly suitable viscosity modifier is high molecular weight polyethylene oxide. The viscosity modifier can be included in any amount to help the coating process, such as up to about 5% by weight, such as about 0.5% to about 3% by weight.

To form the fire retardant portion of the dryer seal 100, the particles 106 of inorganic material can be combined with the film-forming binder 108 to form a coating/paste, which can then be wet-laid onto a surface 109 of the substrate 102 and dried to form the coating 104. For example, the particles 106 can be combined as dry particles or dispersed within a solvent system, as discussed above. After drying, the inorganic material of the particles 106 can constitute about 0.5% by weight to about 99.5% by weight of the total weight of the heat resistant coating 104 (e.g., about 50% by weight to about 95% by weight).

Depending on the level of heat shielding desired for a particular application, the thickness of the heat resistant coating 104 can be varied along with the type of inorganic material included in the particle 108 and/or the concentration of particles 100 in the coating 104. In most embodiments, the thickness of the heat resistant coating 104 can be about 10 μm to about 1 mm (e.g., about 10 μm to about 100 μm).

In some embodiments, a single application of the heat resistant coating 104 on the substrate 102 may be sufficient. However, multiple applications are available and can be applied using the method as described above. Thus, the presently described dryer seal 100 is not limited to a single layer of the heat resistant coating 104 on a substrate 102 of the dryer seal 100.

Figure 7:
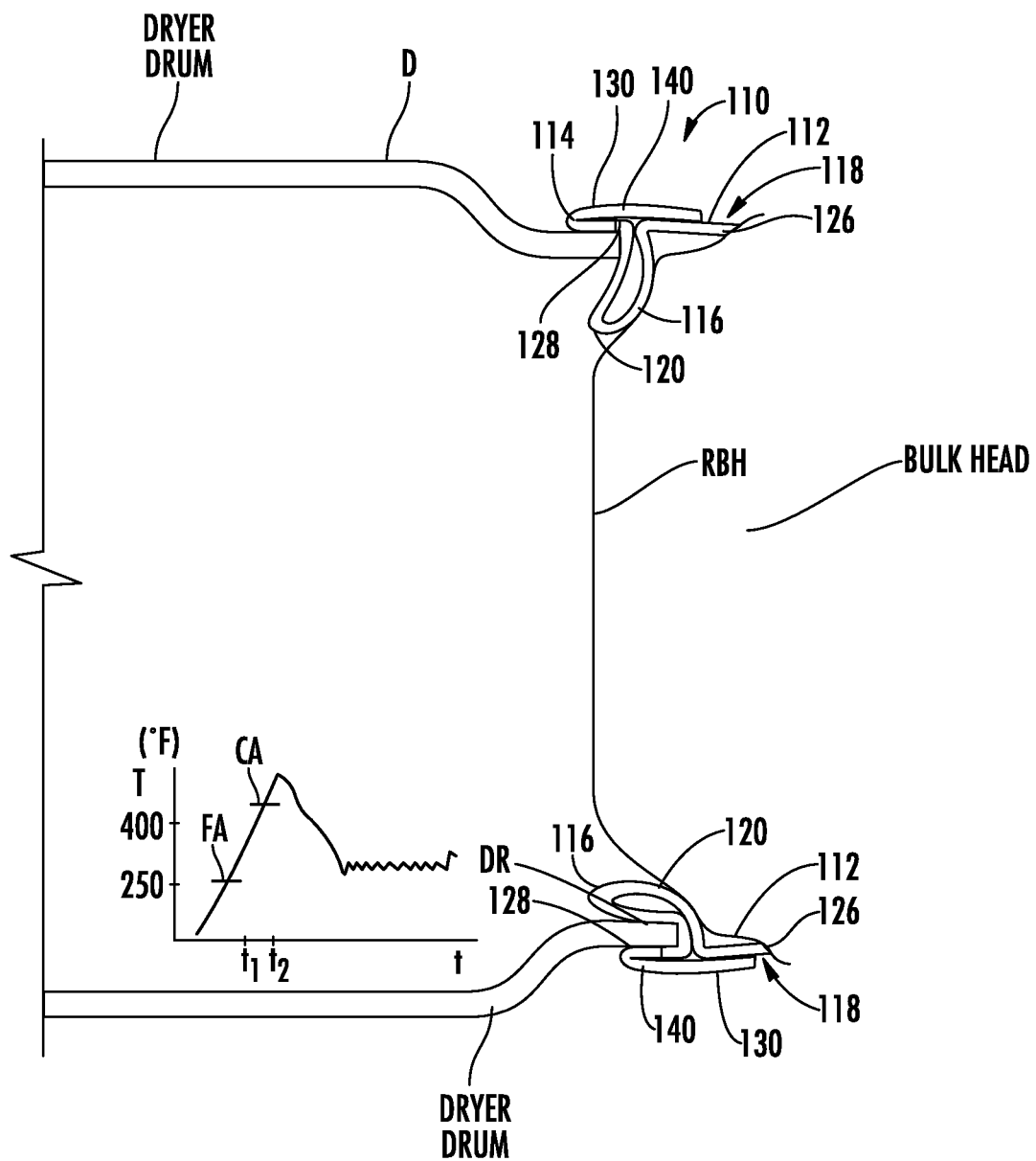
FIG. 7 illustrates a schematic cross-sectional view of a portion of a drum portion of a clothes dryer using an embodiment of high temperature rear seal for a dryer according to the present subject matter and showing a time versus temperature differential with in a drum during an example combustion event according to the present subject matter.

FIG. 7 shows a schematic cross-section of a portion of a dryer having drum D and a rear bulkhead RBH with the drum D positioned with a rear drum rim DR of the drum D around the rear bulkhead RBH. A rear dryer seal 110 can be located between the rear bulkhead RBH and a rear drum rim OR of the drum D. The rear dryer seal 110 can help to reduce or eliminate the opportunity for the occurrence of smoke explosions in the dryers that employ these seals by the low-melt polymer fibers in the rear dryer seals 110 melting when exposed to temperatures above a melting point while a portion of the seal 110 holds a heat resistant coating around the rim DR of the drum D proximate to the gap between the rim DR and the bulkhead RBH. As described above, rear dryer seal 110 can comprise a first substrate 120 and a second substrate 130 with the first substrate 120 having a first side 128 and a second side 128 and the first substrate 120 at least partially comprising a low-melt polymer. The second substrate 130 can be secured to the first substrate 120 at the second side 128 of the first substrate 120.

The first side 126 of the first substrate 120 can be configured to form a side 112 of the dryer seal 110 that forms a contact surface of the dryer seal 110 for contacting a bulkhead RBH of a dryer when installed on a drum D in the dryer. The second substrate 130 can be configured to form a side 114 of the dryer seal 110 that is attached the drum D in the dryer. For example, the side 114 of the dryer seal 110 formed by the second substrate 130 can be secured to the drum D by an adhesive. The second substrate 130 can comprise a high temperature material that has a higher melting point than the low-melt polymer of the first substrate 120. The high temperature dryer seal 110 can comprise a heat resistant coating 140 attached to the second substrate 130. The heat resistant coating 140 is activated at a temperature that is higher than a melting point of the low-melt polymer.

As shown in FIG. 7 the first substrate 120 can form a tonsil 118 of the dryer seal 110 that is configured to extend between the drum D of the dryer and the bulkhead RBH of the dryer and a rear section 118 of the seal 110 that is configured to contact the bulkhead RBH of the dryer. The first substrate 120 can be a low temperature activation substrate that melts before heat activation of the heating resistant coating 140. The heat resistant coating 140 can be configured to activate at temperatures above the melting point of the low-melt: polymer to permit gases in the drum to vent until the temperature activates the heat resistant coating 140 causing the heat resistant coating to expand to restrict air flow into the drum. At the same time, the heat resistant coating 140 can be configured to activate at temperatures below the melting point of the high temperature material in the second substrate 130. In this manner, the beat resistant coating 140 that is secured to the second substrate 130 can be held in place by the second substrate 130 that is attached to: the drum of the dryer even after the first substrate 120 melts and dissipates.

For example, during a combustion event within the drum of the dryer, by allowing at least a portion of the first substrate 120 to melt away and dissipate, hydrocarbons and smoke and air mixture that accumulate within the drum D of the dryer are permitted to vent from the drum D. If the combustion event continues to grow in heat within the drum D, the heat resistant coating 140 still secured around the rim by the second substrate 130 will be activated to reduce the heat within the drum D by restricting air flow into the drum D to smother or contain the fire therein.

For example, as shown in the time elapse Cartesian graph interposed in FIG. 7, where temperature (T) is represented in the y-coordinate and time (t) that represents what can happen when a combustion event occurs within the drum D of a dryer. As the temperature within the drum gets above about 260° F. and then at time $t_1$ reaches and surpasses the melting point shown as FA of the low-melt polymer material in the first substrate 120 and the tonsil 116 and the rear section 118 formed by the first substrate 120 melt and dissipate from the gap between the rim DR of the drum D and the rear bulkhead RBH of the dryer. The temperature at this point is not high enough to ignite the smoke and air mixture accumulating to this point in the drum D and the hydrocarbons therein. The open gap between the rim DR of the drum D and the rear bulkhead RBH of the dryer permits the smoke and air mixture within the drum to escape. As the smoke and air mixture escapes, the heat resistant coating 140 is still held in place proximate to the gap by the second substrate 130 secured to the rim DR of the drum D.

If a fire continues to grow within the drum D and the temperature within the drum continues to rise above: 400° F. and then at time $t_2$ reaches the activation point CA of the heating resistant coating, the heat resistant coating 140 secured to the second substrate 120 will be activated causing the heat resistant coating 140 to grow and close the gap between the rim DR of the drum D and the rear bulkhead RBH of the dryer. In this manner (which can be in combination with airflow restriction systems and operations of a front seal not shown), the heat resistant coating 140 can restrict air flow into the drum D through the gap to smother or contain the fire therein and lower the temperature within the dryer drum to allow a more consistent temperature that will reduce the opportunity for a smoke explosion and contain the combustion event.

The amount of heat resistant coating can be applied in a manner that can be similar to or match the tolerances of the drum within the dryer. For example, a typical dryer drum in its optimum design condition has a drum/bulkhead component tolerance of approximately 0.600 inches. As stated above, in some embodiments, heat resistant coatings on the surfaces of the second substrate that equal about 0.011 inches thick that includes an intumescent substance can grow to approximately 0.300 inches when heat activated. Thus, for a tolerance of approximately 0.600 inches, a double layer of second substrates with each second substrate having heat resistant coatings that equal about 0.011 inches can produce a full intumescent restriction within the drum and bulkhead gap. In some embodiments, a third intumescent substrate can be incorporated to permit a further 0.300 inch seal opening due to the collapse of the drum in the event that the front dryer seal is completely destroyed.

Through heat and flame resistant coatings that comprises mineral based material and/or intumescent substances that is applied on flexible substrates, seals can be provided for use within domestic appliances, such as dryers, that can provide better protection against fire and against exposure to higher temperatures. Current technology uses treated polymers to achieve flame retardant requirements, but fails at heat above about 400° F. Natural or blends of natural fibers can extend the temperature to about 700° F. and are commonly used in such seal applications. Treated synthetic fibrous cellulosic materials are also used in the current technology, but these materials also do not provide the necessary protection at the potential temperature experienced in a dryer fire. The introduction of a vermiculite based and/or intumescent technology seal can extend the range of heat resisting properties whilst enhancing both the static and dynamic fire containment properties in front and/or rear seals used in clothes dryers to help satisfy industry and governmental standards. Currently, there is no dryer seal that at least partially melts to allow air and smoke to escape from the clothes dryer to prevent a smoke explosion and that has a heat resistant coating that then activates to expand to restrict air flow in the drum at higher temperatures to reduce the likelihood of ignition of a fire or reduce the flames of any fire that has ignited to contain the fire within the drum until any flammable material therein is expended.

As described above, a method of manufacturing a high temperature dryer seal is disclosed herein. A first substrate is provided that has a first end and a second end and a first side and a second side with the first substrate at least partially comprising a low-melt polymer. Further, a second substrate is provided that comprises a high temperature material that has a higher melting point than the low-melt polymer of the first substrate. The first end and the second end of the first substrate are secured together so that the first substrate forms at least a portion of an annular shape and the first side of the first substrate is configured to form a side of the dryer seal that forms a contact surface of the dryer seal for contacting a bulkhead of a dryer when installed on a drum in the dryer. The second substrate is secured to the first substrate at the second side of the first substrate with the second substrate being configured to form a side of the dryer seal that is attached the drum in the dryer. A heat resistant coating is attached to the second substrate with the heat resistant coating being activated at a temperature that is higher than a melting point of the low-melt polymer of the first substrate. In some embodiments, the heat resistant coating can be attached to the second substrate by coating, applying or spraying the second substrate with one or more layers of the heat resistant coating. In some embodiments, the heat resistant coating can be attached to the second substrate by coating a third substrate with one or more layers of the heat resistant coating and securing the third substrate to the second substrate. Further aspects and steps of various methods of manufacturing are described at least in part in the above disclosure.

These and other modifications and variations to the present subject matter may be practiced by those of ordinary skill in the art, without departing from the spirit and scope of the present subject matter, which is more particularly set forth herein above. In addition, it should be understood the aspects of the various embodiments may be interchanged both in whole and in part. Furthermore, those of ordinary skill in the art will appreciate that the foregoing description is by way of example only, and is not intended to limit the present subject matter.

What is claimed is:

1. A high temperature dryer seal comprising:
   a first substrate having a first end, a second end, a first side, and a second side, the first substrate at least partially comprising a low-melt polymer;
   the first end and the second end of the first substrate secured together so that the first substrate forms at least a portion of an annular shape and the first side of the first substrate configured to form a side of the dryer seal that forms a contact surface of the dryer seal for contacting a bulkhead of a dryer when installed on a drum in the dryer; a second substrate being secured to the first substrate at the second side of the first substrate, the second substrate being configured to form a side of the dryer seal that is attached the drum in the dryer, the second substrate comprising a high temperature material that has a higher melting point than the low-melt polymer of the first substrate; and
   a heat resistant coating attached to the second substrate, the heat resistant coating being activated at a temperature that is higher than a melting point of the low-melt polymer of the first substrate.

2. The dryer seal according to claim 1, wherein the second substrate comprises a nonwoven fabric, woven fabric, or a knitted fabric.

3. The dryer seal according to claim 1, wherein the second substrate comprises a fiber with silicon therein.

4. The dryer seal according to claim 1, wherein the first substrate forms a tonsil that is configured to extend between the drum of the dryer and the bulkhead of the dryer and a rear section of the seal that is configured to contact the bulkhead of the dryer.

5. The dryer seal according to claim 4, wherein the first substrate is a low temperature activation substrate that melts before heat activation of the heat resistant coating.

6. The dryer seal according to claim 1, wherein the heat resistant coating is configured to activate at temperatures above the melting point of the low-melt polymer to permit gases in the drum to vent until the temperature causes the heat resistant coating to activate causing the heat resistant coating to expand to restrict air flow into the drum.

7. The dryer seal according to claim 6, wherein the heat resistant coating is configured to activate at temperatures below the melting point of the high temperature material in the second substrate.

8. The dryer seal according to claim 1, wherein the heat resistant coating comprises particles of at least one of an inorganic mineral material or an intumescent substance dispersed within a binder.

9. The dryer seal according to claim 1, wherein the heat resistant coating is disposed on the second substrate.

10. The dryer seal according to claim 9, wherein the second substrate is folded back and secured to the first substrate on at least a portion of a surface of the first substrate that does not comprise the contact surface for the bulkhead.

11. The dryer seal according to claim 1, wherein the heat resistant coating is disposed on a third substrate that is secured to the second substrate.

12. The dryer seal according to claim 11, wherein the third substrate is also secured to the first substrate on at least a portion of a surface of the first substrate that does not comprise the contact surface for the bulkhead.

13. The dryer seal according to claim 1, wherein the second substrate comprises a glass-reinforced plastic ("GRP") material.

14. The dryer seal according to claim 13, wherein the second substrate comprises at least one of a glass-reinforced plastic ("GRP") nonwoven or a glass-reinforced plastic ("GRP") scrim.

15. The dryer seal according to claim 1, wherein the first substrate comprises a needled nonwoven fabric.

16. The dryer seal according to claim 1, wherein the first substrate and the second substrate are secured together at the second side of the first substrate by at least one of sewing, needle-punching, ultrasonic welding, or heat sealing.

17. The dryer seal according to claim 1, wherein the first substrate and the second substrate are secured together to form a bi-textile ribbon.

18. A method of manufacturing a high temperature dryer seal, the method comprising:
   providing a first substrate having a first end, a second end, a first side, and a second side, the first substrate at least partially comprising a low-melt polymer;
   providing a second substrate comprising a high temperature material that has a higher melting point than the low-melt polymer of the first substrate;
   securing the first end and the second end of the first substrate together so that the first substrate forms at least a portion of an annular shape and the first side of the first substrate configured to form a side of the dryer seal that forms a contact surface of the dryer seal for contacting a bulkhead of a dryer when installed on a drum in the dryer;
   securing a second substrate to the first substrate at the second side of the first substrate, the second substrate being configured to form a side of the dryer seal that is attached the drum in the dryer, and attaching a heat resistant coating to the second substrate, the heat resistant coating being activated at a temperature that is higher than a melting point of the low-melt polymer of the first substrate.

19. The method according to claim 18, wherein the step of attaching heat resistant coating on the second substrate comprises coating the second substrate with one or more layers of the heat resistant coating.

20. The method according to claim 18, wherein the step of attaching heat resistant coating on the second substrate comprises coating a third substrate with one or more layers of the heat resistant coating and securing the third substrate to the second substrate.

\* \* \* \* \*